United States Patent [19]

Styers

[11] Patent Number: 4,573,925
[45] Date of Patent: Mar. 4, 1986

[54] ELECTRONIC FLIGHT INSTRUMENT DESIGN AND EVALUATION TOOL

[75] Inventor: C. James Styers, Cedar Rapids, Iowa

[73] Assignee: Rockwell International Corporation, El Segundo, Calif.

[21] Appl. No.: 418,105

[22] Filed: Sep. 14, 1982

[51] Int. Cl.⁴ .............................................. G09B 9/08
[52] U.S. Cl. ...................................... 434/49; 434/239; 340/724
[58] Field of Search .......................... 434/43, 239, 49; 340/720, 724, 973

[56] References Cited

U.S. PATENT DOCUMENTS

| | | | |
|---|---|---|---|
| 3,534,396 | 10/1970 | Hart et al. | 235/61.6 |
| 4,149,148 | 4/1979 | Miller et al. | 340/724 |
| 4,185,281 | 1/1980 | Silverstone | 340/706 |
| 4,368,517 | 1/1983 | Lovering | 434/43 |
| 4,390,861 | 6/1983 | Cohen et al. | 340/980 |
| 4,464,652 | 8/1984 | Lapson et al. | 340/709 |

Primary Examiner—Richard C. Pinkham
Assistant Examiner—Leo P. Picard
Attorney, Agent, or Firm—George A. Montanye; H. Fredrick Hamann

[57] ABSTRACT

A design and evaluation system is disclosed which enables the computer generation of graphic displays and symbology used in the design of electronic instrument displays. The graphics and symbology may be positioned, rearranged, altered, and replaced with other graphics or symbology representative of that used in the intended instrument. The display may then be dynamically tested in accordance with programmed or selected manual inputs to determine the aesthetic and functional interactions between symbols or groups of symbols and to evaluate their acceptability in their intended environment. The proposed display may be repeatedly updated, altered and modified during testing until a final version has been selected for the instrument display.

25 Claims, 4 Drawing Figures

Microfiche Appendix Included
(3 Microfiche, 293 Pages)

ELECTRONIC FLIGHT INSTRUMENT DESIGN AND EVALUATION TOOL

A listing of computer programs referenced in the specification is incorporated as a microfiche appendix comprising 293 frames on three (3) microfiche.

BACKGROUND OF THE INVENTION

The present invention relates to electronic control systems and displays and more particularly, to a system and technique for dynamically developing an electronic display format.

In various technologies, conventional electro-mechanical instruments are rapidly being replaced by digital controls and color cathode ray tube display devices. This is particularly true in aircraft monitoring and display systems wherein aircraft indicators are being replaced with compact digital display systems. Although digital techniques may easily be used to convert analog signals used to control meter movements into digital signals which provide numerical readouts of those analog values, an even more significant change has been in the use of stroke-written cathode ray tube technology to display numerical as well as visual graphics and symbols representing aircraft parameters. Thus, for example, conventional Attitude Director Indicators (ADI), Horizontal Situation Indicators (HSI), and other electro-mechanical flight instruments are being replaced with visual displays fashioned on multicolor cathode ray tube (CRT) to produce similar visual images.

In many instances, the new technology CRT display systems are very similar to that of the electro-mechanical instrument displays. However, the versatility of the CRT technology in allowing easily changed numeral and visual data to be displayed simultaneously, has led to a wide variety of proposed changes in display concepts. Thus, may individual displays are now being replaced with single displays and various functions previously performed by mechanical meter movements can now be easily displayed by the use of graphics and symbology on the face of a CRT. The CRT technology likewise allows various individual functions to be selectively multiplexed so that using only one CRT, a multiplicity of modes may be selected, each providing appropriate visual displays indicative of that mode of operation.

In the evolution of the above-mentioned CRT technology, various graphics, symbols, colors, and combinations of alpha-numeric and visual data are proposed during the development of a particular instrument. During that development cycle, many possible alternatives may be suggested, but there is still a problem in selecting that one which is most advantageous in use. Because of the inherent flexibility and versatility of the cathode ray tube, there is a tendency to have cluttered displays containing more information than is necessary or capable of being perceived in the operational environment. Accordingly, in order to determine which display format is acceptable, prior art practices have basically employed hit-and-miss construction techniques for forming a particular instrument display format. Thus, an instrument display having selected characteristics would first be produced in prototype form and then analyzed to determine its effectiveness. Thereafter, it would be redesigned and modified until a final acceptable product had been achieved.

As will be apparent from the above, even with the improved technology there remains significant trial-and-error in the production of electronic instrument displays using the prior art techniques. As a result, only a limited number of visual display formats are ususally considered even in the development of a CRT display. This experimentation and development is essentially confined to the use of graphics, symbols and alpha-numerics to form visual displays similar to that used in prior art electro-mechanical instruments. In addition to the significant design effort required using prior art practices, the regulating agencies also tend to discourage innovative changes in instrument displays since they are reluctant to certify instruments when their operation and visual acceptability cannot be analyzed before final production. As a result, any production of new displays which vary greatly from the norm is normally expensive and time consuming.

As advances in technology lead to the development and initiation of many different types of aircraft, there is a severe need for systems and techniques capable of producing and quickly evaluating electronic displays. The invention has therefore been developed to overcome the specific shortcomings of the above known and similar techniques and to provide an improved apparatus for aiding the development and certification of aircraft flight instruments and displays.

SUMMARY OF THE INVENTION

In accordance with the present invention, an interactive graphics system having a cathode ray tube display is combined with a general purpose digital computer capable of simulating aircraft flight conditions and controlling aircraft instrument displays and movement in response to those conditions. The interactive graphics system is configured to allow the preparation, selection, alteration, modification, rearrangement, and display of various display items (graphics, symbols and alpha-numerics) on the face of a cathode ray tube. The system is constructed to enable the storage and selection of different display items as well as the development of new display items within its data base. The interactive graphic system is coupled to the digital computer and programmed to simulate various aircraft configurations and displays so that control signals may be coupled through the graphics system to change and move individual display items on the CRT display to reflect the actual operation of an instrument display during flight conditions. The resultant display may thus be dynamically reviewed and then easily modified and reevaluated to improve its performance in its intended environment. The described system enables the construction and evaluation of numerous alternative displays in a real-time dynamic environment which may be altered to reflect the environment of various aircraft configurations. This facilitates the complete evaluation of various alternative displays prior to their final production designs.

It is therefore a feature of the invention to provide a system for developing and evaluating electronic instrument displays.

It is a further feature of the invention to provide a system and technique for developing various configurations of stroke-written color CRT displays and dynamically evaluating and changing those displays.

Still another feature of the invention is to provide an aircraft instrument design and simulation system capable of producing and evaluating displays for use in aircraft flight instruments.

Another feature of the invention is to provide a dynamic system for developing graphics, symbols, alpha-numerics and other visual displays for use in aircraft flight instruments.

Yet another feature of the invention is to provide a system and technique for designing a variety of aircraft instrument displays and providing real-time dynamic simulation of each of those displays.

These and other advantages and novel features of the invention will become apparent from the following detailed description when considered with the accompanying drawings wherein:

DETAILED DESCRIPTION OF A PREFERRED EMBODIMENT

Figure 1:
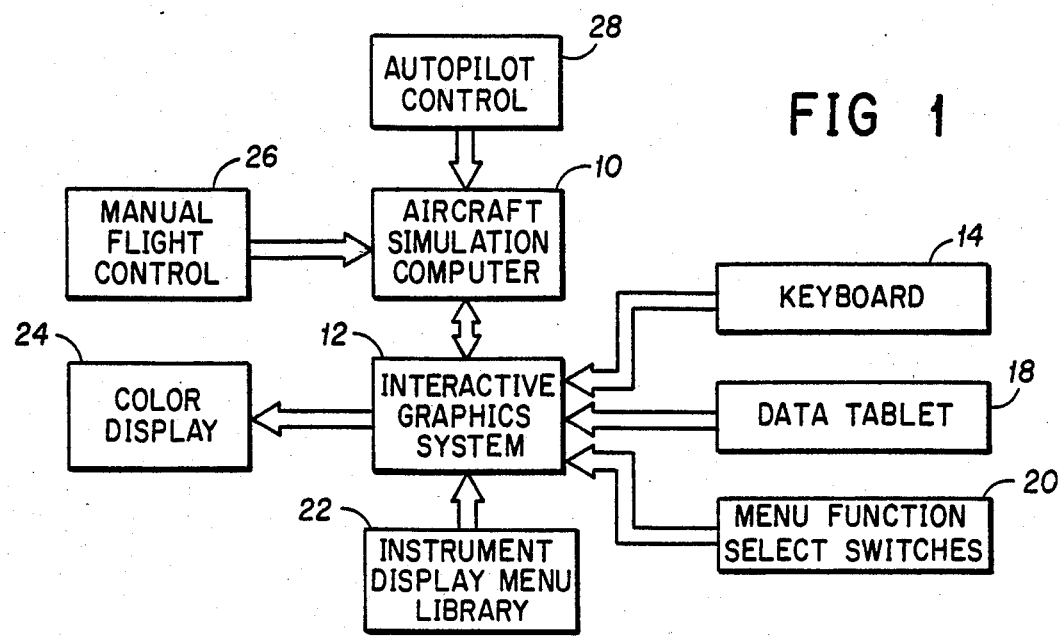
FIG. 1 is a schematic diagram showing the elements comprising the inventive system.

As was previously noted, prior art electro-mechanical flight instrument displays have been designed primarily by trial-and-error with time consuming techniques. For example, photographic cutouts of display items (symbols, alpha-numerics, graphics, etc.) typically have been assembled with other photographic cutouts of other display items to form a picture representing a desired instrument display. Once the picture of that display is approved by a customer, the instrument itself is then built, laboratory tested and modified until its final test in an aircraft simulator or in actual aircraft flight. As can be appreciated, any mockup of an actual device requires a significant investment of time and money without really knowing beforehand how different items of the display will interact with one another during flight conditions to provide the desired parameter display. In many cases, the static design of the flight instrument display appears acceptable when the pictures are assembled, but in operation, do not cooperate so that the changes or movement of individual display items is sufficient to provide an easily perceived display during dynamic flight. As a result, the aircraft instruments are generally built with time-tested display items so that few modifications are necessary in the final product, thereby prohibiting significant increases in the cost of the development of such instruments. Naturally, however, the use of new display elements and new technologies is discouraged since modifications subsequent to the prototype construction are so expensive and time consuming.

With the advent of electronic flight instruments and more particularly with the use of stroke-written CRT displays in digital avionics systems, a whole new technology of flight and information display is now available. The inherent flexibility of CRT technology and the numerous alternatives in symbols, graphics, alpha-numerics and other display characters (herein referred to as display items) naturally lead to a wide range of alternatives for instrument displays. Although this versatility is appealing, the multiplicity of possible display items capable of being produced on the CRT is still limited by the same restrictions encountered in the design of electro-mechanical displays. Thus, the multiplicity of alternative display items must be displayed, viewed, and approved prior to construction and testing of the actual instrument. As a result, although the technology has advanced and provided techniques for generating many different display items, the expensive and time consuming nature of instrument approval for aircraft certification and customer acceptance still severely limits producting of novel instrument displays.

In accordance with the present invention, a system and technique has been developed which facilitates the design and development of numerous alternative display items and combinations of display items for producing improved instrument displays. The system enables the generation of display items, the formation of displays with multiple items, the modification of proposed displays, the storage of alternative display items, the dynamic evaluation of individual display items in combination with other display items forming an instrument display, the presentation of proposed display items in a display closely approximating that which will be finally produced in a production unit, and the evaluation of proposed production displays for dynamic response and visual certification and acceptance.

Referring first to FIG. 1, the system includes a primary digital computer 10 which in the present instance is indicated to be an aircraft simulation computer. The computer 10 may be any general purpose or special purpose computer capable of interfacing with manually variable inputs or autopilot inputs and responding to those inputs for providing electronic display controls. In the present example, the computer 10 was configured as an aircraft flight simulation computer capable of receiving input commands from an aircraft wheel/column control 26 and resolving those commands in accordance with its program to produce simulated aircraft movement. Likewise, the computer 10 is coupled to receive alternative input from a simultated aircraft autopilot 28 which may provide control indicative of a predetermined flight path or flight profile which is converted in the computer to again produce simulated aircraft movement. The simulated aircraft autopilot 28 is a program reflecting simulated autopilot operation which provides inputs representing aircraft flight control in accordance with a predetermined program. The selection of inputs from manual control 26 or autopilot control 28 is made by the programming within computer 10 and may be easily chosen during dynamic testing by the operator through a conventional computer keyboard entry.

In response to the simulated flight, the computer 10 generates signals which are used to control the specific display items of an electronic flight instrument to cause movement or change in the manner as would normally occur in response to changing parameters during aircraft flight. Thus, for example, the parameters such as pitch, roll, yaw, altitude, acceleration, heading, etc. change as the aircraft flight path is changed and signals representing these parameters are generated by computer 10 to control the display elements (e.g., compass rose, aircraft symbol, etc.) to reflect that change as the aircraft flight path evolves. The computer 10, in the present instance, was a VAX 11/780 with a Virtual Memory Operating System (VMS), Fortran compiler and library for user base software which may be purchased as a commercial item from Digital Equipment Corporation. This computer is capable of generating the information necessary to reflect the movement or positioning of display items in response to manual or autopilot flight movements as reflected by wheel/column control 26 or autopilot 28.

The computer 10 is coupled to an interactive graphics system 12 which is also a computer system specifically configured and programmed to allow the generation of color symbols, alpha-numerics and other graphics displays which may be transmitted to and viewed on a stroke-written CRT 24. The system 12 may be any conventional system capable of creating different display items or objects, and presenting them in different combinations and configurations on the face of the CRT 24. In the present instance, the system chosen was an Evans and Sutherland Multiple Picture System (MPS) with a color graphics terminal and Fortran selectable graphics subroutines for user base software as may be purchased from Evans and Sutherland Corporation. The commercial Evans and Sutherland system includes a data tablet and stylus which enable different display items to be created and displayed on the CRT and a plurality of function switches 20 which allow various functions to be performed on a particular display item as will be subsequently described. As an individual component, the interactive graphics system is capable of producing a variety of graphics, symbols and alpha-numerics which may be selected and arranged on the CRT 24. Such operation in the commercial system, however, requires a high level of operator programming skill and only results in the production of a static display which must be reconfigured by programming each time changes or modifications are desired. In addition, the functions provided by the data tablet, stylus, and switches are limited in their application and variety.

In accordance with the present invention, the interactive graphics system 12 has been combined with the simulation computer 10 and programmed in accordance with that detailed in the computer listing of Fortran instructions in the microfiche appendix filed in connection with this specification. This combined system allows the generation, selection, rearrangement, movement, and other alterations of display items (objects) on the CRT for a real-time dynamic evaluation of the display items and their associated change or movement in response to manual or autopilot flight paths. More specifically, a conventional keyboard entry terminal 14 is coupled to the graphics system 12 to allow selection and control of the system through its programming to provide for the static construction of a particular display and subsequently the dynamic evaluation of that display. In the static mode, the aircraft simulation computer 10 is removed from active control in the system, while in the dynamic mode, the aircraft simulation computer 10 provides information to the interactive graphics system 12 to change or move the display items appearing on the CRT 24 in response to manual or automatic aircraft movement.

Upon entry of an instruction through keyboard 14 to operate the system in the static mode, the graphics system 12 receives input from an instrument display menu library which includes the programming required to generate a "menu" of basic display items which may include such objects as a triangle, square, circle, line segment, compass rose, aircraft symbol, etc. and which may be selected and displayed on the face of the CRT 24. The menu library is provided in the attached programming appendix for interactive graphics system 12 but is schematically illustrated as element 22 in FIG. 1. Thus, for example, the programming of the attached listing is designed to generate multiple objects as display items, 16 of which are disclosed in the attached listing. The program lists those display items, each of which may represent a particular aircraft symbol (for example, a compass rose, an aircraft symbol, a heading failure flag annunciator, a VOR course failure flag annunciator, etc.) in groups with each group of display items forming a page of computer display on a portion of the CRT 24. Each page will thus display (on a portion of the CRT) a certain number of display items and the particular page is selected through the system 12 programming of the attached appendix.

Figure 2:
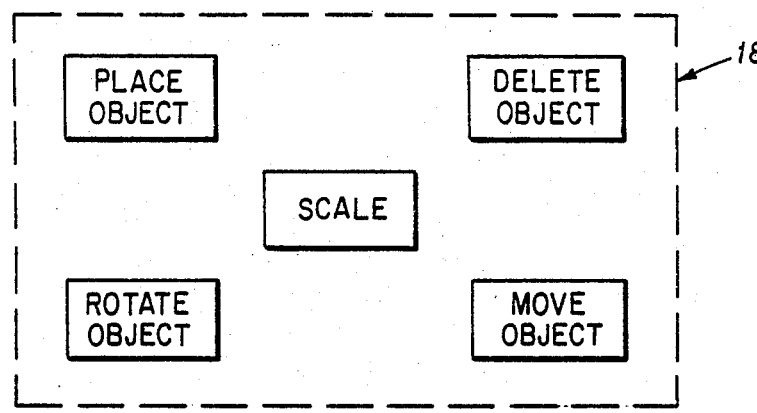
FIG. 2 is a schematic diagram showing the functional elements of data tablet in FIG. 1.
Figure 3:
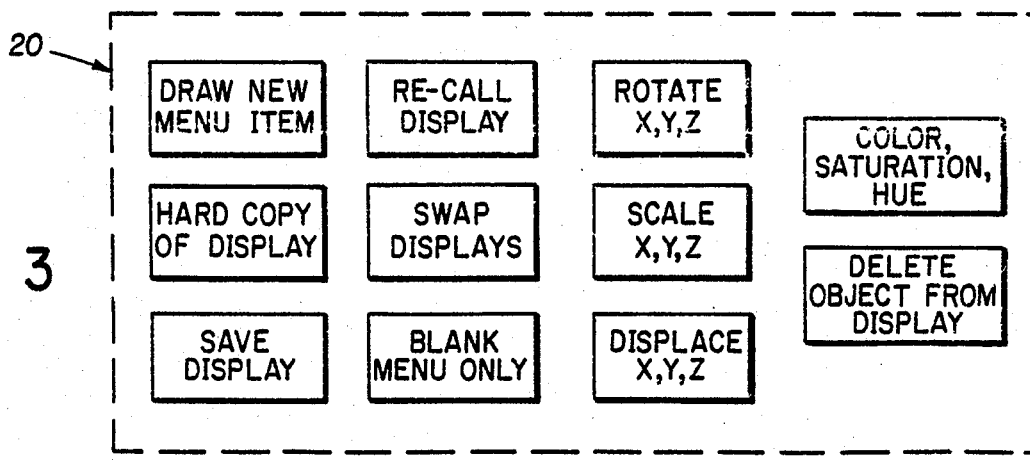
FIG. 3 is a functional diagram showing the elements of the menu function select switches in FIG. 1.

After selection of the appropriate page of the menu, the page is displayed on a portion of the CRT 24. The data tablet 18 and the menu function select switches 20, both of which are part of the conventional interactive graphics system 12, are then used to control the selection, positioning and rearrangement of display items on another portion of the CRT display 24 to construct a proposed instrument display. The data tablet 18, for example, may be used to select a display item, rotate a display item, delete a display item, or move a display item using a stylus pen in connection with the data tablet as part of the graphics system 12. Likewise, the function select switches 20 on the control panel of system 12 may be used to position and control the display items and configuration viewed on the color display 24 and select additional menu pages. FIG. 2 schematically represents a few of the functions that may be controlled by the stylus and data tablet 18 while FIG. 3 schematically represents a few of the control functions which may be exercised by the function selects switches 20. As noted, the data tablet and function switches are standard hardware on the Evans and Sutherland but are tied specifically to the program in the appendix to produce the unique functions generated by that programming. Once the appropriate display items have been selected from a displayed page of the menu library 22, a new page of the menu library may be selected from that stored in 22 and displayed on the CRT 24 for further modification of the instrument display being formed.

As will be apparent (using the noted programming), an operator may select from the menu library (in the case, approximately 256 different display items), any number of display items with which it is desired to form an electronic display. Each display item is constructed about a predetermined reference point which will be used to position that display item and all other display items on the CRT 24. Consequently, similar objects may be generated as individual display items with the only difference being the position of the object relative to the reference point. These objects are automatically generated by the referenced programming and may be transferred from their position on the display menu page to a position on the color CRT forming the electronic display by use of the data tablets, stylus and function switches. A reference position on the CRT 24 defines the placement of the display items and aligns with the reference point of each display item. The function switches 20 and data tablets 18 (including stylus) allow the positioning, rearrangement, and substitution of other objects for any of those selected and displayed on the color CRT 14 in accordance with the menu provided by the programming. As configured, the system also allows additional disply items to be directly added to the menu by adding or drawing on the data tablet with the stylus or by direct keyboard entry in the graphics system 12.

After the display items have been selected and arranged in a desired format, the resulting display constitutes a static visual indication of the desired electronic instrument display. As will be apparent, the plurality of display items provided by the menu enables the specification of detailed symbol sizes, shapes, colors positions, etc. With these display items, a new electronic display can be easily created by an operator without the need for specific programming knowledge or a knowledge of the programming of the system. The operator is therefore able to call, modify, scale and position the display items, primarily by means of the data tablet and stylus which control the position of a cursur, and consequently the display items, on a portion of the CRT 24 of graphics system 12.

Figure 4:
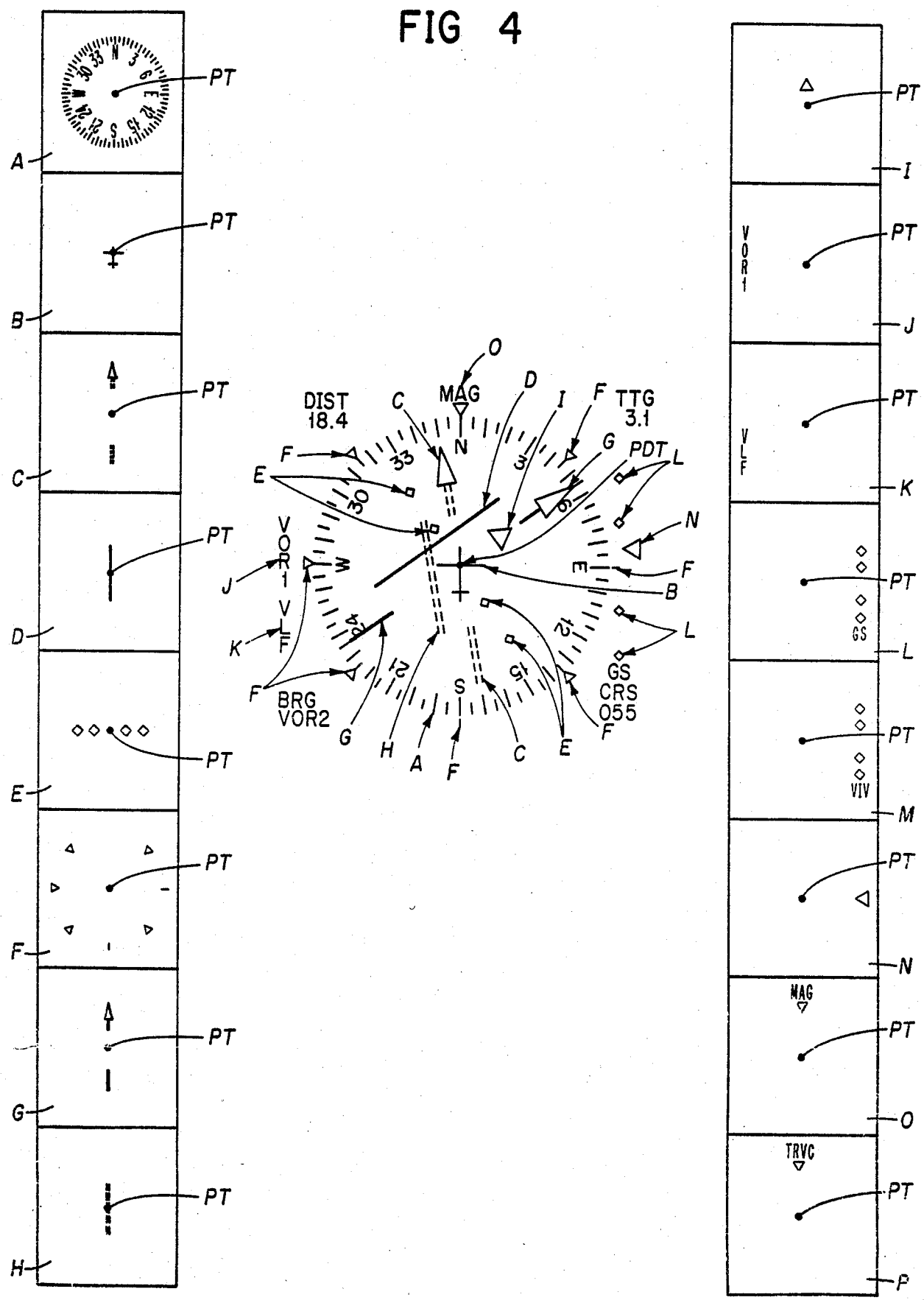
FIG. 4 is a schematic diagram showing an example of the display items which may be oriented, scaled, and otherwise modified in accordance with the present invention.

Referring now to FIG. 4, there is shown a more detailed diagram of a page of menu along with a constructed instrument display as it would appear on the CRT during construction of an instrument display. In this example, each of the objects shown in blocks A through P constitute an invdividual display item (for a total of 16 display items forming the page of menu) and each item is oriented specifically with respect to reference point PT. The proposed instrument display 30 is composed of a variety of the display items A through P as well as other display items which may be selected from other pages of menu. The instrument display is formed, as was previously noted, by using the stylus and data tablet 18 as well as function select switches 20 to position the individual disply items with respect to one another of the CRT 24 and control their size, shapes, color, etc. Each of the display items are positioned on CRT so that reference point PT of each display item aligns with a reference position PDT on CRT 24.

Upon completion of a proposed display, the display items can be changed in size, color, shape, or intensity by use of the stylus and data tablet 18 or function select switches 20 in cooperation with the attached program of the appendix. Similarly, individual display items may be rotated and translated to other positions on the CRT 24 and additional display items may be substituted or added directly on the CRT 24 by means of the stylus and data tablet or the keyboard 14 of the interactive graphics system 12, all in accordance with the program set forth herein. As will be understood, the preprogrammed menu selection coupled with the conventional interactive graphics system 12 produces a capability of presenting various designs which may be reviewed for visual acceptability with only simple operator control of graphics system control elements 18 and 20. This significantly reduces the time necessary to create and design specific instrument displays and make changes to those displays when the originals are determined unacceptable.

In accordance with the above system, once a proposed instrument display has been configured on the CRT 24, the mode selection through keyboard 14 may be used to regenerate that instrument display on CRT 24 through graphics system 12 for coordinated change or movement of the display elements in response to simulated aircraft control through computer 10. Using the specific instructions in the attached programming list of the appendix, the selected display items are matched with the appropriate control signals from computer 10 to cause the display item to change or move in response to an appropriate aircraft parameter. At this time, the manual flight control 26 may be used to provide input for simulating pilot control of aircraft movement of a predetermined flight profile may be controlled by the autopilot 28. The computer 10 will provide outputs in response to those movements which are converted and coupled by the aforementioned program in the graphics system 12 for control of the movement of the specific display items on the CRT 24. For this purpose, the interactive graphics system 12 is interfaced with the aircraft simulation computer 10 so that specific outputs of the computer 10 will be channeled to specific display items representing displays of those aircraft movements. Thus, for example, a conventional compass rose, which may be created on the CRT, will be tied through the graphics system 12 for movement in response to a signal representing aircraft heading provided by manual flight control 26 and/or autopilot 28 through computer 10. The response of the rose in the completed visual display shown on color CRT 24 will thus be viewed in a dynamic environment in conjunction with all other display items forming the electronic display. This evaluation permits consideration of the smoothness of object movement, visibility of pointers against background information, and detection of unforeseen anomalies or confusion factors as would be encountered in actual aircraft flight.

As will be appreciated, the programming required in computer 10 to provide the control signals for display item change or movement is conventional and is represented by differential equations normally associated with aircraft flight. The specific conditions and constants used in the differential and other equations may be fixed for a variety of aircraft in the computer 10. Thus, for example, the movements and controls for a Boeing 727 may be provided through the graphics system 12 to control movement of display items on CRT 24 and the same display items may be analyzed for operation in an L-1011 simply by selection of the appropriate aircraft response characteristics through simulation computer 10. The flight characteristics and responses may be obtained from an aircraft manufacturer and easily inserted into the equations controlling signal production from the computer 10.

If following the dynamic evaluation, a change is needed in any of the display items of the electronic display formed on CRT 24, the mode selection provided through keyboard 14 may be used to operate the system in the static mode and changes may then be made in the display by a simple selection from the menu or entry by stylus 18 and function switches 20 as was previously described. The mode selection through keyboard 14 may then be used to place the system in the dynamic mode and the new electronic display again regenerated and evaluated in simulated aircraft flight. The dynamic evaluation and static construction may thus be interchanged quickly for inexpensive and efficient design and evaluation of the flight instrument. As a result, an instrument may be prepared and reviewed by customers for specific acceptability and the reviewed by appropriate agencies for instrument certification. If at any time during the design and review process, the display is considered unsatisfactory by the customer or the regulatory agency for certification, the display items may individually be changed without significant time or costly modifications. This review may be performed numerous times within the period of several hours or days in contrast to many months for performing the same evaluation process in the prior art.

As will be apparent, the above system provides a cockpit simulation and design technique which is capable of efficiently and thoroughly evaluating new instrument display concepts. The evaluation process may be carried out at all stages of development from initial to final product design. Determinations of acceptability of the display and modifications can be made early in the design process by considering the many alternative options provided by the menu of display items. The system thus permits an evaluation of those alternate concepts in a managable and time-efficient manner. Subsequently, the dynamic evaluation of the proposed design enables a determination of unacceptable visual responses and allows the substitution or rearrangement of display items prior to final production determinations. This allows a greater variety of displays to be selected for certification and also enables changes to be easily made in accordance with customer attitudes or aircraft types. With only simple changes in aircraft type through computer 10, a variety of aircraft responses may be viewed on a proposed electronic display. The menu thus provides numerous selections for matching the display with the most desirable aircraft and configuration. As described, the system does not require a sophisticated operator to obtain the benefit of flexibility and speed. Each of these are advantages that have been unrecognized in prior-known systems.

While the above system and technique has been described with reference to specific aircraft instrument displays and computer systems 10 and 12, it will be apparent that other systems capable of providing the interaction and interface as above-described may be used in their place. The system may be configured to provide for the generation of other vehicular instrument displays or any instrument display reflecting parameters that may be simulated on computer 10. Although the list of those electronic instruments would be too numerous to mention, it is apparent that the dynamic simulation could be conventionally modified to receive signals representing other vehicles, machines, or any other varying parameters for movement of selected display elements through graphics system 12.

Obviously, many other modifications and variations of the invention are possible in light of the above teachings. It is therefore to be understood that within the scope of the appended claims, the invention may be practiced otherwise than as specifically described.

What is claimed is:

1. A process for generating and evaluating instrument displays comprising:
   generating a plurality of display items representing parts of an instrument display;
   selecting and arranging individual ones of said display items in a configuration forming an instrument display;
   generating a plurality of individual control signals wherein each control signal represents a changing parameter visually displayed by said instrument display; and
   altering individual display items in response to selected ones of said individual control signals to dynamically change the visual appearance of said instrument display in response to said changing parameters.

2. The process of claim 1 wherein each of said display items are coupled for control by a single control signal to reflect one changing parameter.

3. The process of claim 1 wherein said step of generating display items comprises forming a display menu library of multiple display items with a predetermined number of display items forming a page of menu, and selecting individual display items from said pages of menu.

4. The process of claim 1 wherein said step of generating control signals representing changing parameters comprises simulating the operation of a device and providing control signals representing said changing parameters produced as a result of that simulation.

5. The process of claim 4 further comprising the step of providing manual changes in said simulation to effect changes in said parameters.

6. The process of claim 4 further comprising the step of providing automatic changes in said simulation to effect changes in said parameters.

7. The process of claim 4 wherein said step of simulating comprises simulating aircraft flight and changing parameters represented by aircraft flight conditions.

8. The process of claim 7 further comprising the step of providing manual changes in said simulated aircraft flight from an aircraft wheel/column control.

9. The process of claim 7 wherein said step of simulating aircraft flight comprises simulating said flight with a simulated autopilot control.

10. The process of claim 7 wherein said step of simulating further comprises simulating a plurality of aircraft types for flight simulation and selecting one of said aircraft types for providing said changing parameters in response to the simulated flight of that selected aircraft type.

11. An instrument display design and evaluation system comprising:
   means for generating a plurality of control signals representing varying parameters displayed by an instrument;
   means for generating a plurality of individual display items, with each display item being associated with a different one of said varying parameters and including means for forming a menu of said display items;
   means for selecting and displaying individual ones of said display items in the configuration of an instrument display; and
   means for altering said display items in response to said control signals to reflect the dynamic operation of the instrument display in response to said changing parameters.

12. The system of claim 11 wherein said means for generating control signals comprises a means for generating control signals responsive to simulated aircraft flight.

13. The system of claim 12 further comprising means for providing manual inputs for altering said control signals responsive to aircraft flight.

14. The system of claim 12 further comprising means for altering said control signals in response to simulated autopilot control of aircraft flight.

15. The system of claim 11 wherein said means for generating control signals includes means for generating control signals representative of the flight of a particular aircraft type.

16. The system of claim 15 wherein said means for generating control signals representing the flight of a particular aircraft type further includes means for altering the aircraft type and associated control signals for producing control signals representing the flight of a different aircraft type.

17. The system of claim 11 wherein said menu library includes a predetermined number of display items forming at least one page of menu.

18. The system of claim 11 wherein said means for selecting and displaying further includes means for electronically displaying said configuration of display items as a visual representation of said instrument display.

19. The system of claim 18 wherein said means for electronically displaying comprises a color cathode ray tube.

20. An electronic flight instrument design and evaluation system comprising:
an aircraft simulation computer having a first input responsive to an aircraft wheel/column flight control and a second input responsive to a simulated autopilot control for simulating aircraft flight and generating control signals representing changing parameters in response to said simulated aircraft flight;
means for selectively controlling the generation of said control signals in response to one of said wheel/column control and said simulated autopilot control;
an interactive graphics system having a menu library for selectively generating a plurality of individual display items, each of which represent a portion of a display of an aircraft instrument and further including means for selecting individual ones of said plurality of display items for forming a configuration of an instrument display representing an aircraft instrument;
a color display coupled to said interactive graphics system for displaying the configuration of said selected display items; and
means for coupling said aircraft simulation computer to said interactive graphics system for altering said selected display items in response to said control signals to provide dynamic simulation of said instrument display.

21. The apparatus of claim 20 wherein said aircraft simulation computer includes a means for selectively simulating the flight of different aircraft types in response to said first or second inputs and providing control signals representing the flight of a selected aircraft type.

22. The system of claim 20 wherein said color display is a stroke written cathode ray tube.

23. The system of claim 20 wherein said interactive graphics system further includes means for altering the position, size, and orientation of selected display items forming said instrument display.

24. The apparatus of claim 20 further comprising means for substituting different display items for selected ones of said selected display items to form a different configuration of instrument display.

25. A process for generating and evaluating instrument displays comprising:
generating a plurality of display items which visually represent parts of an instrument display;
generating a plurality of individual control signals wherein each control signal represents a changing parameter visually displayed by said instrument display;
selecting and arranging individual ones of said display items in a configuration forming an instrument display;
altering individual display items in response to selected ones of said individual control signals to dynamically change the visual appearance of said instrument display in response to said changing parameters;
reselecting and rearranging individual ones of said display items in response to said dynamically changing visual appearance to form a different configuration of instrument display; and
again altering individual display items in response to selected ones of said individual control signals to dynamically change the visual appearance of said instrument display in response to said changing parameters.

* * * * *